S. T. HURD.
LOOM-SHUTTLE CHECK AND BINDER.

No. 169,995. Patented Nov. 16, 1875.

WITNESSES:
E. Wolff
Alex F. Roberts

INVENTOR:
S. T. Hurd
BY
ATTORNEYS.

UNITED STATES PATENT OFFICE.

SETH TEBBETTS HURD, OF GONIC, N. H., ASSIGNOR TO HIMSELF AND THOMAS SANDERSON, OF LAWRENCE, MASS.

IMPROVEMENT IN LOOM-SHUTTLE CHECKS AND BINDERS.

Specification forming part of Letters Patent No. 169,995, dated November 16, 1875; application filed July 24, 1875.

*To all whom it may concern:*

Be it known that I, SETH T. HURD, of Gonic, in the county of Strafford and State of New Hampshire, have invented a new and Improved Shuttle Check and Binder, of which the following is a specification:

My invention relates to a shuttle-binder and other devices which serve as a substitute for the ordinary shuttle-box; also, to the picker-rod, and the connections between the binding-finger shaft and the dagger-shaft.

Figure 1:
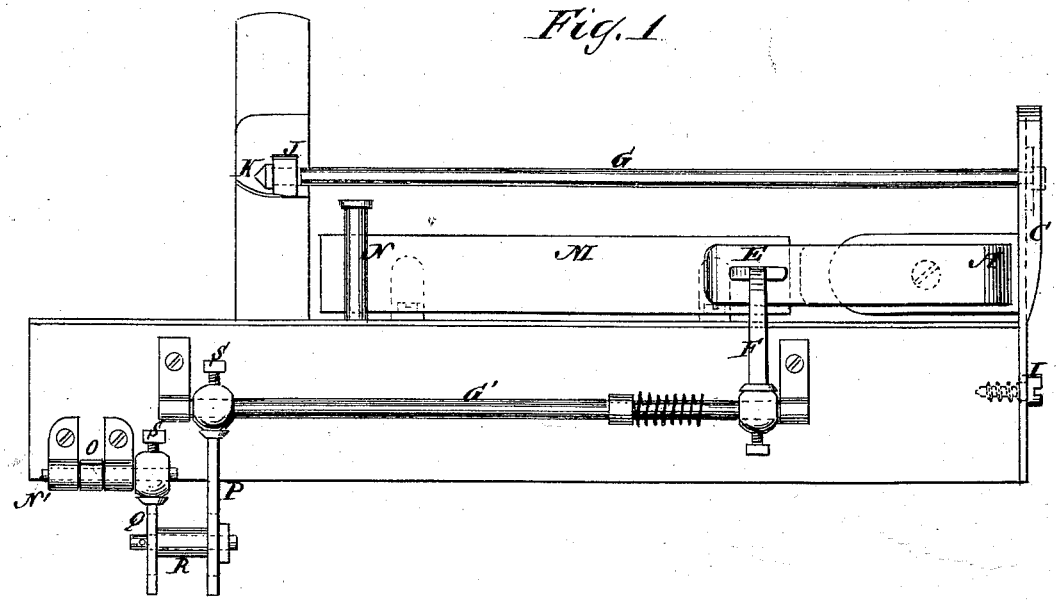
Figure 2:
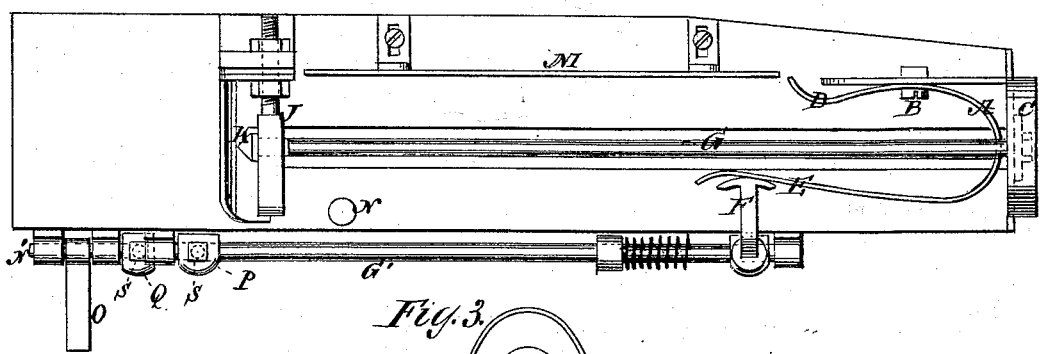
Figure 3:
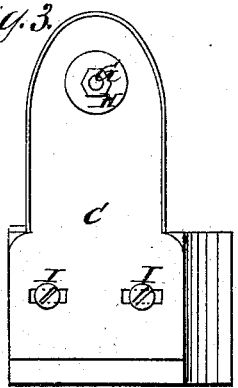

Figure 1 is a side view of my invention. Fig. 2 is a top view, and Fig. 3 is an end elevation.

Similar letters of reference indicate corresponding parts.

A represents the U-shaped shuttle checking and binding spring, being attached at B to an arm of the head-block C, for its support, and arranged to receive the shuttle between its two members, one of which forms a comparatively stiff pressure-spring at D, while the other, E, operates as the binder, being arranged in connection with the binder-finger F on the rod G'. This head-block also supports the rear end of the picker-rod G, which is fastened in it by the nut H, and it is attached to the race-beam by screws I, affording lateral adjustment for lining up the rod, which, at the other end, has lateral adjustment in the supporting-arm J, and it is square in the hole in said arm, which is of corresponding form, to hold it against turning without using the binding-screw commonly used, which often springs the rod out of line. The rod is also held in this arm by a head, K, so as to be drawn up straight and stiff by the nut H. M is an adjustable side board, which, in connection with the front guard-stud N and spring A, forms a substitute for the ordinary shuttle-box having closed walls or sides. The board M is adjustable toward or from the guard-stud N and spring, so as to increase or diminish the race or space in which the shuttle runs. The shaft G', which carries the binder, is connected to the shaft N', carrying the dagger O of the stop-motion, by a slotted arm, P, on it, also a slotted arm, Q, on the dagger-shaft, and the adjustable stud R, connected to the slotted arms, so that the position of the dagger can be varied by shifting the stud along the arms, one of which swings from an axis in a different position from that of the other shaft, and both arms are adjustable around their shafts, and have set-screws S to fasten them in any position.

Having thus described my invention, I claim as new and desire to secure by Letters Patent—

1. The combination of the U shaped shuttle checking and binding spring A, formed in one piece, with the head-block C, its arm, and the binding-finger F, all arranged and operating substantially as and for the purpose set forth.

2. The combination of the slotted arms P Q and adjustable stud R with the binder-finger shaft G' and the dagger-shaft N', substantially as specified.

3. The combination of the picker-rod G, adjustable supports C J, head K, and nut H, all constructed and arranged as set forth.

4. The combination of the guard-stud N, adjustable side board M, U-shaped spring A, and head-block C, all arranged as and for the purposes set forth.

SETH TEBBETTS HURD.

Witnesses:
FREDERICK H. CROCKER,
ARTHUR D. WHITEHOUSE.